United States Patent Office 3,142,274
Patented July 28, 1964

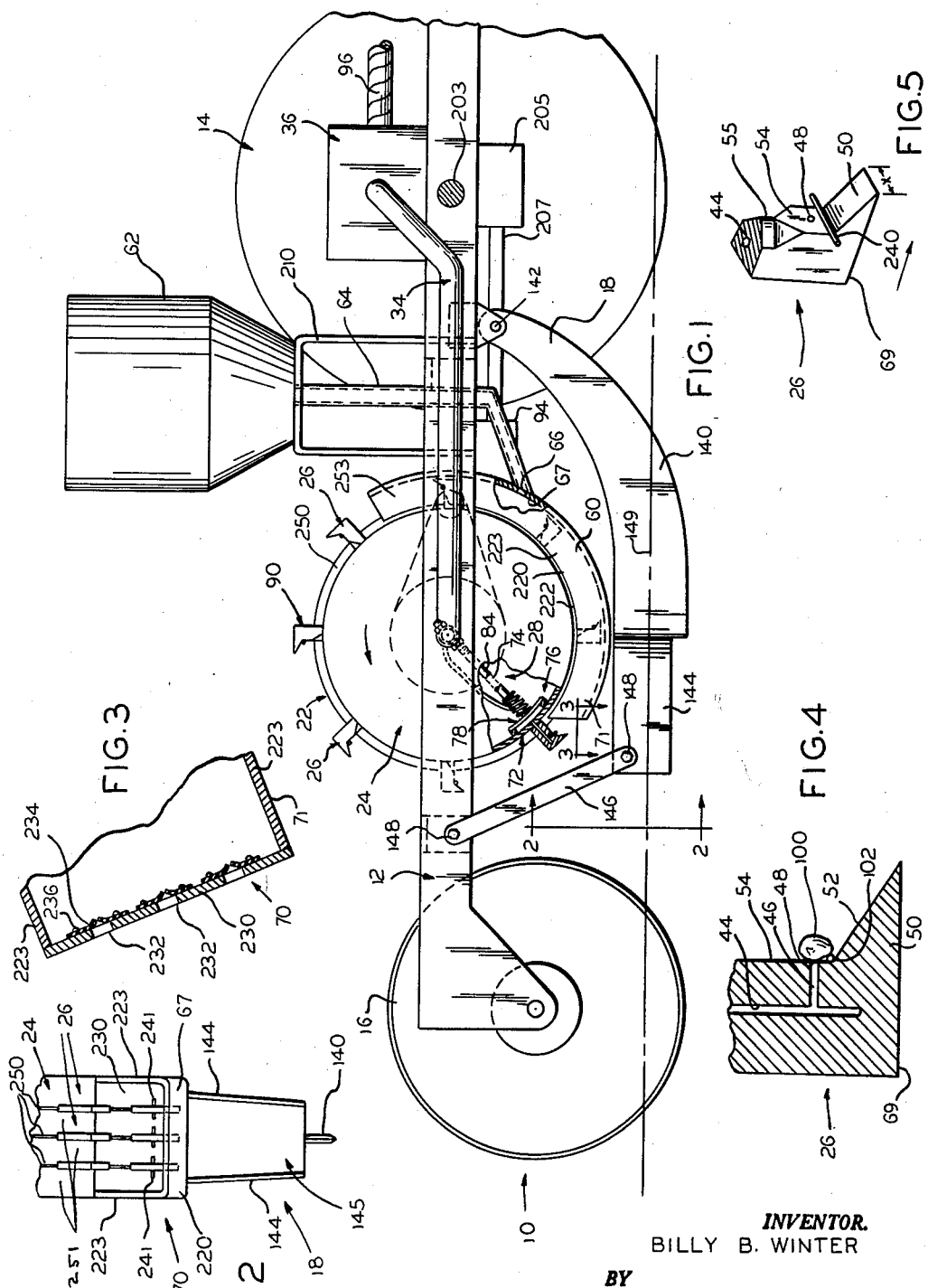

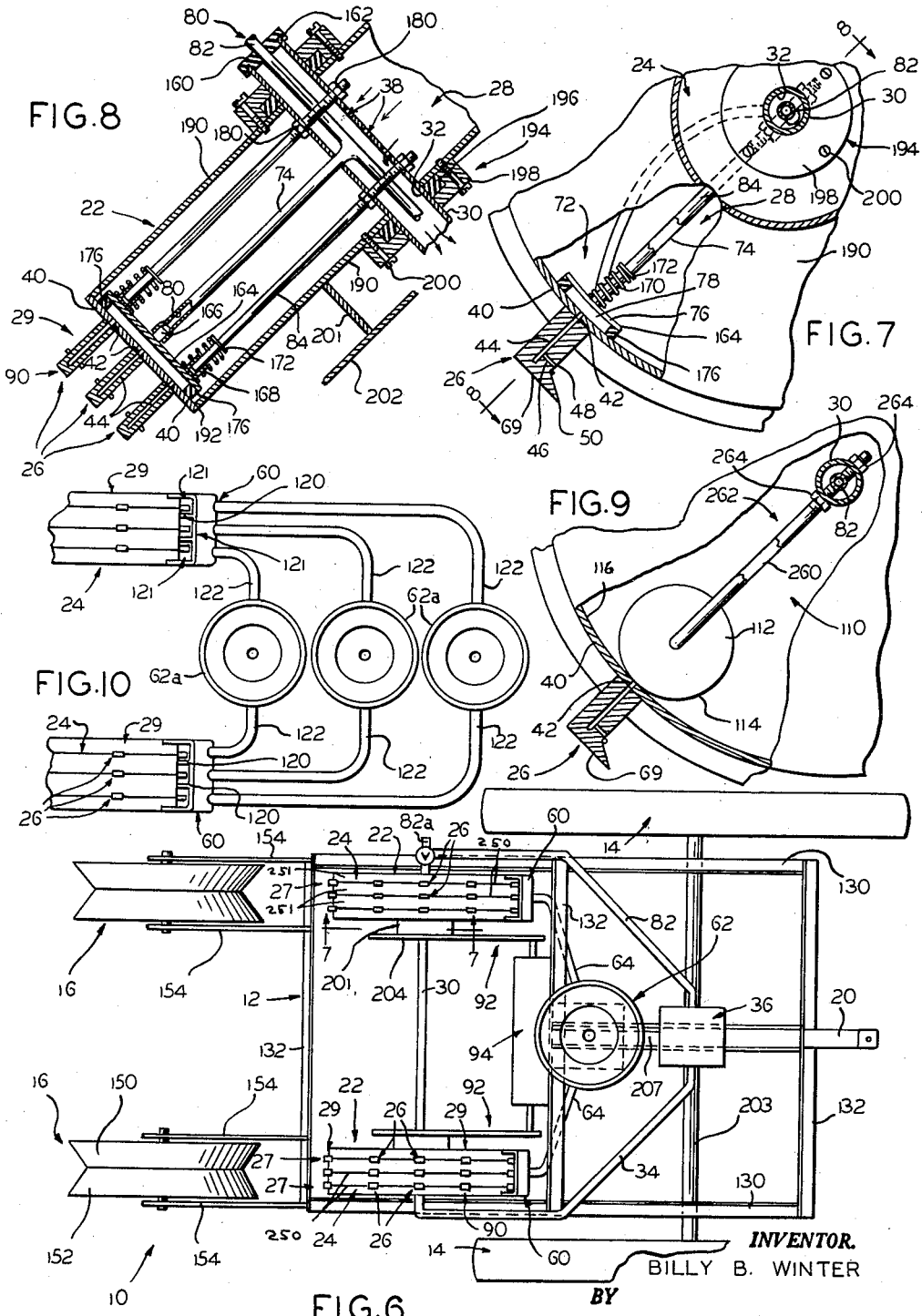

3,142,274
DEVICE FOR HILL DROPPING CORN
Billy B. Winter, Towanda, Ill.
Filed Nov. 20, 1961, Ser. No. 153,564
11 Claims. (Cl. 111—34)

My invention relates to a machine for distributing seeds and the like, and more particularly, to a seed planting machine for practicing the art of agronomy, particularly with reference to those products, such as corn, that require "hill" planting, as distinguished from those that are planted by broadcast seeding or "drilling."

One of the basic principles of corn agronomy is that maximum yields can be obtained for given soil type and fertility level only by planting the proper number of kernels per acre. This means that for a given soil type and fertility level, maximum yields will be obtained (assuming normal weather conditions) when the proper number of hills per acre are planted, and each hill receives a proper number of seeds. A proper number of hills per acre necessarily contemplates an optimum spacing between hills and rows of hills.

The provision of proper row spacing is readily achieved, but the spacing of hills of a row and the applying of the necessary number of seeds to each hill are matters that are at the heart of long-standing problems in this art.

Conventional planter apparatus usually employs a mechanical seed selecting device that is intended to mechanically select the proper number of seeds from those flowing from a hopper and direct them to the hill that is being formed. In more recent years these devices have been of the seed plate or planter plate type, in which a seed plate is employed that is formed with cells for receiving the individual seeds to be planted. Planter seed plates contemplate that the individual cells of the plate will consecutively select or receive a seed to be planted and then convey it to a discharge or dispensing point where the seed is discharged for depositing on the ground. The drive for these plates is usually taken from the planter wheels, and the whole mechanism is calibrated to give or make available desired hill spacings in each row of hills.

It necessarily follows that the seed plate cells must be equivalent in size to the size of the seed being planted, if any numerical control of seed dispensing is to be had. Consequently, there must be a special seed plate for each size and variety of seed that is to be planted, and the seeds must be graded to insure that only seeds of the proper size and shape are supplied to the seeder plate.

Moreover, the individual selecting action of the seed plate has to repeat itself for each hill location until the total seeds per hill are attained. Also, after the seeds are individually selected, they are maintained in the hill grouping by suitable valve, or spacing along a chain, or some other convenient method, and after traveling down a guide tube or boot, they are discharged into the hill by a valving operation. Consequently, seed plate type planters involve many mechanical operations and movements that must be carefully coordinated and calibrated to provide anything approaching reasonably acceptable results, and in the nature of things, apparatus of this type is difficult to maintain at optimum operating conditions even under the most favorable circumstances.

Studies in the field of corn agronomy have shown that most of the factors that cause variations from the desired maximum yield may be attributed to use of the planter or seed plate type dispensing apparatus. Some of these are:

(A) Improper fit of kernels to the seed plate employed.

(B) Slippage of the planter driving wheel.

(C) Use of a planter driving wheel have a size different from that used in calibrating the seed dispensing mechanism.

(D) Using a planting speed which exceeds that in which calibration was made.

(E) Wearing and rusting of the seed dispensing components.

Nevertheless, those concerned with making improvements in the corn agronomy art still continue to use the planter or seed plate principle in working out new developments, and consequently, the adverse effects of the above factors are merely lessened (if changed at all) and not eliminated, due to the fact that these and other factors are inherent in the nature of the seed plate type dispensers. See, for example, the following recently granted patents: 2,975,936, 2,980,043 and 2,991,909.

Contrary to current thinking in this art, my invention contemplates the elimination of the seed or planter plate principle, and the use instead of a vacuum type seed dispensing device that accurately selects seeds, regardless of variations in size or kind, while providing for a simultaneous multiple seed drop per hill.

While some prior work has been done on vacuum type seeding devices, none of the resulting structures that I am aware of have sufficient accuracy to compete with the conventional planter plate approach. For instance, some of the vacuum principle approaches have involved the use of a rotating vacuum drum provided with holes around its periphery or rim and some manner of scraping or knocking the seeds off the drum at the appropriate time. However, tests of this type have shown that the drum missed picking up seeds too frequently to be reliable, and that the individual seeds that were picked up tended to push ahead of them and over the drum one or more other seeds that dropped uncontrollably to the ground and were lost. See, for instance, U.S. Patent Nos. 1,371,517 and 1,762,671 for examples of this type of apparatus.

Also, some work has been done using rotating vacuum fingers to pick up seeds, but here again test have shown that both the seed pick up frequency and the carry over frequency above mentioned were subjected to the same objections noted above, and further, that release of the individual seeds did not occur with the systematic regularity required for optimum accuracy, moreover, the subsequent handling of the seeds just prior to planting aggravated this effect. For examples of this type of apparatus see U.S. Patent Nos. 2,031,113 and 2,737,314.

A principal object of my invention is to provide a seeding device for corn planters and the like that eliminates the seed grading requirement and provides for an accurate simultaneous multiple seed drop.

A further principal object of my invention is to eliminate from seeding devices for corn planters and the like the accuracy and speed limitations imposed by seed dispensing arrangements that are dependent upon physical movement of mechanical metering structures for performing seed selection and dropping functions.

Another principal object of my invention is to provide a seeding device for corn planters and the like which has only one primary moving part per row.

Still other objects of the invention are to provide a seeding device for corn planters and the like that permits simultaneous planting of several different types of seeds, that is not affected by the level of the seed supply in the feed hopper, that permits planting of a predetermined number of seeds per hill at exactly the desired hill spacing per row, that permits planting speeds up to the maximum permissible speed of operation of conventional planter shoes, and that is economical of manufacture, convenient in use, and readily adapted for application to a wide variety of granular material handling problems.

Further objects, uses and advantages will become obvious or be apparent from a consideration of the following detailed description and the application drawings.

In the drawings:

FIGURE 1 is a diagrammatic side elevational view of a corn planter embodying the principles of my invention, with parts broken away to expose other parts;

FIGURE 2 is a fragmental elevational view substantially along line 2—2 of FIGURE 1, illustrating the cooperation between the vacuum drum of this invention and its associated seed trough as well as the planter shoe;

FIGURE 3 is a fragmental cross-sectional view through the lower end of the seed trough, substantially along line 3—3 of FIGURE 1;

FIGURE 4 is an enlarged cross-sectional view through one of the vacuum seed pick-up fingers or legs of the apparatus shown in FIGURE 1, showing a corn seed in operating association therewith;

FIGURE 5 is a diagrammatic perspective view of the finger structure shown in FIGURE 4;

FIGURE 6 is a diagrammatic plan view of the structure shown in FIGURE 1, though on a somewhat reduced scale;

FIGURE 7 is a fragmental enlarged elevational view, partially in section, taken substantially along line 7—7 of FIGURE 6, illustrating an important feature of the vacuum selector of this invention;

FIGURE 8 is a cross-sectional view substantially along line 8—8 of FIGURE 7;

FIGURE 9 is a view similar to that of FIGURE 7, but illustrating a modified form of the invention; and FIGURE 10 is a fragmental plan view similar in nature to that of FIGURE 6, but illustrating a further modified form of the invention.

However, it is to be understood that the specific forms of the invention shown in the drawings and described in the specification are provided primarily to satisfy the requirements of 35 U.S.C. 112, and that the invention may be embodied in other forms which will be obvious to those skilled in the art.

*General Description*

Reference numeral 10 of FIGURE 1 generally indicates a tested and proved embodiment of my invention which comprises, in the form illustrated, a wheeled frame 12 provided with the usual planter wheels 14, press wheels 16, and planter shoes 18, which may be arranged and associated with the frame 12 in any convenient manner, though it may be mentioned that the planter shoes and press wheels are employed in pairs that are aligned longitudinally of the intended path of movement of the planter 10. The frame 12 is provided with a tongue 20 (see FIGURE 6) or other suitable means for hitching to a tractor or other appropriate propelling vehicle.

In accordance with this invention, the frame 12 carries a pair of rotatably mounted vacuum members 22, and each of the members 22 is in the form of a vacuum drum 24 provided with a plurality of outwardly projecting fingers or arms 26 that are arranged in coplanar rows 27 (see FIGURE 6) about the circumference of the respective drums as well as rows 29 (see FIGURE 6) transversely of such circumference (compare FIGURES 1 and 6).

The drums 24 are each formed to define a vacuum chamber 28, and each drum is rotatably mounted on a tubular shaft 30 (FIGURES 6 and 7) fixed in any suitable manner to frame 12 and having its bore 32 connected by appropriate conduiting 34 (FIGURES 1 and 6) to a source of vacuum, such as an appropriate type of vacuum pump generally indicated at 36. The portions of the tubular shaft 30 that are covered by the respective drums 24 are formed with a plurality of openings 38 (see FIGURE 8) which place the chambers 28 defined by the respective drums in communication with the bore 32 of shaft 30, whereby such chambers 28 are subject to the vacuum conditions imposed by pump 36.

The individual fingers or legs 26 are secured to the drum rims 40 in alignment with perforations 42, and the specific individual fingers or legs illustrated define passages 44 and 46 (FIGURES 4 and 7) that communicate between an orifice 48 and the drum openings 42 so that during operation of the apparatus 10, the orifices 48 are in the form of suction ports or mouths whereby air at atmospheric conditions outside the drums 24 tends to flow into the drums to fill the vacuum conditions created by pump 36.

The configuration of the fingers or legs illustrated is of considerable importance. As brought out by FIGURES 4, 5 and 7, the fingers or legs 26 are each provided with a cradling foot 50 that extends in the direction of rotation of the respective drums 24 and is shaped in the specific form illustrated to define a planar tapering seed guide surface 52 which merges with a short planar seed abutment surface 54 on the forward side of the respective fingers or legs 26, that is, the side that faces the direction of rotation of the respective drums 24. In accordance with this invention, the surface 54 of each finger or leg 26 lies parallel to a radius of the axis of rotation of the respective drums 24 and is perpendicular to the plane of rotation of the respective drums. The surface 52 preferably tapers in the direction of the respective drum rims 40 and lies in a plane that is perpendicular to the plane of rotation of the respective drums 24.

Also associated with the apparatus 10 is a curvilinear or arcuate seed trough or tray 60 that is positioned adjacent each drum 24 and has a shape substantially complementing the configuration of the respective drum rims 40. The seed to be planted by apparatus 10 is supplied to the respective seed troughs 60 from a suitable hopper 62 through the respective conduits 64 and inlet ports 66 (see FIGURE 1) to maintain a supply of seed in the feed troughs at the desired operating levels. As indicated in FIGURES 1 and 6, the fingers or legs 26 of the drums pass through the feed troughs on rotation of the drums in performing the seed pick up function about to be described and the relation between such elements 26 and the trough should be such that the outer ends 69 of the fingers or legs 26 are disposed closely adjacent the floor 67 of the troughs. The seed troughs 60 are provided with an appropriate gate structure 70 (see FIGURE 3) at their lower ends 71 to contain the seed within the respective seed troughs.

Further in accordance with this invention, the drums 24 of apparatus 10 are each provided with a seed release device generally indicated at 72 in FIGURE 7, which generally comprises a tubular arm 74 formed with a base structure 76 that is in contact with the rim 40 of the respective drums and is shaped to define air pressure chamber 78, which is supplied with air under pressure through the bore 80 (see FIGURE 8) of member 74 that in the present instance is placed in communication with the high pressure side of vacuum pump 36 through appropriate conduiting 82 (see FIGURES 6 and 8). The member 74 of each drum 24 is braced against rotation by support arms 84, and as indicated in FIGURES 1 and 8, the drum fingers or legs 26, and in particular their passageways 44 and 46, come into communication with the air pressure chambers 78 when they are positioned immediately above the rear end of the planter shoe 18.

While the spacing and relative positioning of the fingers or arms 26 about the drums 24 (see FIGURES 1 and 6) is largely optional insofar as the actual seed pick up and delivery functions are concerned, preferably such fingers or legs are disposed in parallel rows 29 across or transversely of the circumference of the respective drums to define finger or leg groups 90 for picking up and delivering the seeds to go into each hill. The spacing between the respective groups 90, together with the speed of rotation of the respective drums 24, will dictate the spacing between hills in a row of hills, and this will depend upon the operator's evaluation of planting conditions. The drums 24 in the illustrated embodiments of the invention are two in number, making the apparatus 10 a two-row planter, though obviously this showing is merely provided for simplicity of illustration and the number of rows to be planted simultaneously is optional. Drums 24 are rotated in any suitable manner, such as through a chain drive 92 actuated by a suitable speed change mechanism generally indicated at 94 that receives its drive from the planter wheels 14 in any suitable manner.

In operation, the hopper 62 is supplied with, for instance, corn seed, and the apparatus 10 driven over the corn field in the usual manner, as by being towed by a suitable tractor, with vacuum pump 36 being actuated by being appropriately connected to the tractor power take off, as through flexible shafting 96 shown in FIGURE 1.

The seed from hopper 62 flows by gravity into the respective seed troughs 60, and as the drums 24 rotate in the direction of the arrow of FIGURE 1, the fingers or legs 26 pass through the respective seed troughs and through the seed contained therein, somewhat as suggested by FIGURE 1. As the individual fingers or legs 26 pass through the body of seed in the respective troughs 60, the surfaces 52 and 54 are brought into abutting engagement with the seeds; the angulation of the surface 52 with respect to surface 54 provides a seed positioning arrangement which guides one of the seeds corn, for instance, seed 100 of FIGURE 4, toward and into engagement with the finger or leg suction orifice 48.

The surfaces 52 and 54 of the fingers or legs 26 additionally serve to brace or cradle the seed 100 against dislodgement as the individual fingers or legs 26 are drawn through the body of seed in the respective seed troughs 60, with the result that as the individual fingers or legs 26 emerge from the upper end of the respective seed troughs, a seed 100 will be carried by the respective fingers or legs 26, due to the ambient air tending to pass into the suction orifices 48.

The respective fingers or legs 26 then move away from the upper end of the respective seed troughs 60 and thence in a downwardly moving direction under the rotating action of the respective drums in the direction of the respective planter shoes 18, which in the meantime are forming the usual opening in the soil that is normally associated with such structures. As the individual vacuum fingers or legs 26 move into communication with the air pressure chambers 78, the source of vacuum is momentarily disconnected from the respective finger orifices 48 and instead a flow of air under pressure from the chamber 78 proceeds through the finger or leg passageways 44 and 46, and through orifice 48 and against the seed 100 to eject it from the orifice 48 and start it on a free fall toward the soil groove formed by the planter shoe 18. In accordance with this invention, the individual seeds 100 in falling from the fingers or legs 26 move directly to the ground, and as the vehicle or apparatus 10 moves away from the seeds, the press wheels 16 perform their customary functions of closing the ground over the seeds.

In the forms of the invention illustrated, three seeds are dropped simultaneously to form a hill grouping since the fingers or legs 26 are arranged in groups 90 of three transversely of the rim of the respective drums (although obviously this number can be varied to suit requirements). It will be noted that the three seeds forming a hill grouping (in the illustrated apparatus) are simultaneously picked up, carried and then dropped into planting position without requiring individual consecutive selection or appropriate valving or boot arrangements to control the functions intended.

In addition to the foregoing, there are several important size and shaping characteristics of the fingers or legs 26 that must be observed to obtain the optimum planting accuracy that this invention is capable of providing. The sizes of seeds employed in the more customary agronomy practices range from one-eighth inch to one-half inch in maximum dimension and tests have shown that the surfaces 52 and 54 of the respective fingers or legs 26 should have a width (the dimension $x$ of FIGURE 5) on the order of $3/16$ to $1/4$ of an inch, that is, that lies in the range of from about three-sixteenths of an inch to about one-quarter of an inch. This width insures that only one seed 100 will be cradled by the respective fingers or legs 26 so that other seeds will fall away from the respective fingers or legs 26 and not be carried over the tops of the drums 24.

Also, the suction orifices 48 of the individual fingers or legs 26 should be positioned or spaced from the juncture 102 of the surfaces 52 and 54 a distance on the order of $1/8$ inch to best handle average size corn seed and other seed of comparable size. This insures that the seed 100 will rest flush against surface 54 when it is under the holding action of the suction orifice 48 which is necessary to provide proper adherence of the seed to the finger and cam the extra seed to either side of the finger. This is particularly important with regard to corn seed since it permits a corn seed 100 to become attached to the orifices at its broad sides as well as at its narrow sides.

If the orifice 48 were located at the juncture 102, a seed 100 might tend to be drawn against both surfaces 52 and 54 under the air flow action generated by the reduced pressures in vacuum chambers 28 and thus bridge over, but be spaced from orifice 48, thereby preventing a positive holding action on the seed. Since, in accordance with my invention, one seed, and only one seed, is to be picked up and dropped from each individual finger or leg 26 to provide an accurate numerical control on the seeds planted, it is important that the pickup of two or more seeds by a single leg or arm 26 be avoided, and that the seed which is picked up is firmly held until released where desired.

In addition, the surface 52 (of foot 50) provides a cradling support for the seed 100 that becomes attached to each finger or leg 26. Thus, foot 50 supports and braces the seed 100 from below, against the dragging action of adjacent seeds, as it is drawn through and out of the body of seed in the seed trough. Surface 52 need not be tapered to effect this result, but the taper is preferred because of the tendency of the taper to initially guide a seed 100 to an orifice 48, as the individual fingers or legs 26 move through the body of seed in the respective seed troughs.

Furthermore, the fingers or legs 26 between surfaces 54 and the drum rims 40 are formed on their forward sides to define the knife or wedge shaped edges 55 that are best shown in FIGURE 5. These edges prevent extra seed from being carried out of the troughs 60 since they preclude seed other than the seed 100 at the orifice 48 from having a braced engagement with the respective fingers. Thus, fingers 26 will "knife" through the body of seed without picking up unwanted seed in addition to the seed 100 that becomes adhered to the suction orifice. Preferably, the respective surfaces 54 are of sufficient dimension longitudinally of the respective fingers 26 that orifices 48 are at least more or less centrally located therein.

In the embodiment of FIGURE 9, the seed ejecting arrangement 72 is eliminated in favor of a rolling valve device 110, which comprises a roller member 112 extending transversely of the rim 40 of the respective drums 24 and provided with a resiliently flexible exterior roller surface 114 which rolls along the interior surface 116 of the respective drum members 40 as the respective drums are rotated during operation of the device. As the respective sets of fingers or legs 26 move by the rollers 112, the rollers 112 momentarily cut off communication between the source of vacuum and the orifices 48 and release the seeds from the orifices 48. The surface 114 of the respective rollers 112 should be sufficiently flexible and bear against the drum rim 40 with sufficient force such that as rollers 112 roll along the rim 40, their surfaces are sufficiently pressed into openings 42 to at least slightly compress the air in passageways 44 and 46 so that a charge of air is sent through orifices 48 that will push the respective seeds 100 free from orifices 48.

In the embodiment of FIGURE 10, the respective seed troughs or trays 60 are provided with longitudinally extending divider flanges 120 which divide the seed troughs 60 into separate seed receptacles 121, that may be supplied with three different types of seed from the individual hoppers 62a through appropriate conduits 122 as suggested in the drawing. This arrangement permits three different types of seed to be applied to a single hill, or if desired, the seeds may be two and one of different varieties, as will be obvious to those skilled in the art. For example, two of the seed trough containers or compartments could be supplied with corn seed and the third with a different kind of seed with the result that multiple seed planting may be accomplished for any desired purpose.

*Specific Description*

The conventional components of apparatus 10 that are illustrated, such as frame 12, hopper 62, planter wheels 14, planter shoe 18 and press wheel 16, may be of any conventional type known to the art and associated together in any conventional manner. For purposes of illustration, the frame 12 is shown being made up of longitudinally extending frame members 130 secured together by transversely extending frame members 132, but obviously this may be varied at will to suit the designer's requirements. However, the frame 12 should be arranged for appropriate connection to a tractor type vehicle, or be self-propelled, as for instance, in the manner already described.

The planter shoe 18 and press wheel 16 for each drum 24 are entirely conventional in nature and are only diagrammatically illustrated. These components are usually incorporated in a separate assembly for each row, and the relation between assemblies must be such that each assembly can move vertically as required to follow the ground contour. The planter shoe 18 ordinarily comprises cutting blade portion 140, provided at its rearward end with spaced plow arms 144 that define a seed receiving chamber 145 (see FIGURE 2) and form the soil opening into which the seed is dropped. In the form shown, blade portion 140 is shown hinged to frame 12 at 142 and the arms 144 are shown secured to the frame 12 by link 146 held in place by appropriate bolts 148 or the like. However, this showing is merely for purposes of indicating that the planter shoe and wheel move with the drums 24 relative to the ground, and in practice any conventional planter shoe and wheel mounting arrangement may be employed, as will be apparent to those skilled in the art.

The planter shoe 18 is conventionally a one-piece element that is forged or otherwise formed to define the shape indicated, and in use has a relation to the soil level 149 approaching that indicated in FIGURE 1.

The press wheels 16 conventionally take the form of a wheel structure having a V-shaped rim 150 whereby the tapering configuration of the rim halves 152 tends to press the soil together over the seeds lying in the groove that is formed by the planter shoe. In the present instance, the press wheels are shown journalled between appropriate plates 154 (see FIGURE 6) fixed in any suitable manner to the rear end of the frame 12, but obviously, the manner of attaching the press wheel 16 to the frame is optional so long as the press wheels perform their customary functions.

The vacuum pump 36 may be of any suitable commercial make that will provide the degree of vacuum required to give the seed holding action desired at the finger or leg orifice 48.

Likewise, the conduiting 34 may be of any suitable character and be connected to the hollow shaft 30 in any appropriate manner, though in the illustrated embodiment, the conduit is shown applied to the end of the shaft 30 at the lower side of FIGURE 6. At the other end of the shaft 30 (see FIGURE 8), an appropriate sealing disc 160 is applied to the terminal end 162, which disc 160 receives and sealingly engages the conduit 82 that extends from the pressure side of vacuum pump 36.

The conduit 82 extends into and through the bore of the shaft 30 between the respective drums 24, and at the respective drums 24 an appropriate connection is established between the tubular rods 74 and the conduit 82 in the manner suggested by FIGURE 8.

As shown in FIGURES 7 and 8, the base structure 76 that defines the air compression chamber 78 is formed by a plate member 164 provided with a nipple 166 that is inserted into the tubular rod 74; the plate member 164 also carries spaced sleeves 168 which receive the outer ends of the support rods 84. Helical springs 170 applied between washers 172 fixed to the respective support rods 84 and the plate 164 bias the plate 164 in the direction of the drum rims. In the illustrated embodiment, Teflon or nylon elements 176 are affixed to the rim of the plate 164 to provide an appropriate seal around the rim of the plate 164 and they thus define a quadrilateral flat air pressure chamber 78.

Alternately to connecting pressure chamber 78 to vacuum pump 36, chamber 78 may be vented to the atmosphere, as by employing valve V of FIGURE 6 in line 82 and positioning it in communication with pipe 82a that is open to the atmosphere.

The support rods 84 are affixed to the tubular shaft 30 by appropriate nuts 180, as shown in FIGURE 8. The conduit 82 may be formed to bend around the portions of the support rods 84 that extend through the shaft 30, as suggested by FIGURE 7.

The individual drums 24 are defined by circular sides or discs 190 that are fixed as at 192 to the drum rims 40 in any manner that will provide an effective seal against air leakage. The individual drums 24 are journalled in any appropriate manner on the shaft 30 and in the embodiments illustrated, they carry appropriate sealing units 194 that seal off the contacting surfaces of the drum discs 190 and the shaft 30. In the form illustrated, the sealing units 194 each comprise a resiliently deformable disc 196 formed from rubber or the like which is compressed against the respective drum discs 190 by cap member 198 held in place by appropriate bolts 200.

As indicated in FIGURES 6 and 8, each of the illustrated drums 24 have fixed thereto an annular mounting member 201 carrying an annular sprocket element 202 which engages an endless chain member 204 that is in turn trained over a suitable sprocket structure not shown actuated by gear box 94. The gear box 94 may be provided with any appropriate controls for varying the speed of rotation of the respective drums 24, under the drive provided by rotation of the planter wheels (through, for instance, planter wheel shaft 203, gear box 205 and transmission shaft 207 extending to gear box 94, with these elements all being appropriately coupled together through suitable gearing or the like) as the apparatus 10 is moved across the field. Alternately, the gear box 94 or its equivalent could be driven by or through a suitable connection with the towing vehicle power take-off or by a suitable motor carried by apparatus 10.

The hopper 62 may be of any suitable type, and applied to the frame 12 in any appropriate manner, it being shown in the illustrated embodiments as being fixed to a stand structure 210 that is in turn fixed to the frame 12 in any appropriate manner. The seed conduits 64 may be of any appropriate type and connected to the seed openings 66 of the respective seed troughs in any appropriate manner.

The respective seed troughs 60 are in the form of an arcuate tray-like receptacle 220 which have a configuration that substantially complements the curvature of the drum rims 40. Preferably, the concavely curving rims 220 of the seed trough sides 223 are positioned closely adjacent to the respective drum rims 40 to prevent seed loss between these two components. The floor 67 of the respective troughs should have a curvature that is struck on a radius extending from the axis of rotation of the respective drums so that the floor of the respective seed troughs 60 substantially complements the curved path of movement of the respective fingers or legs 26 (the ends 69 of which may have a like curvature, though they are shown as being planar in the illustrated embodiment). I prefer that the seed inlet openings 66 of the respective seed troughs 60 be in the trough floors and be positioned well below the level of the axis of rotation of the drums 22, as indicated in FIGURE 1. Tests have shown that this arrangement provides a reasonable tolerance for seed fall back from the fingers or legs 26 as these fingers or legs move upwardly of the respective seed troughs 60.

The lower end of the respective seed troughs 60 is closed by gate structure 70, as indicated in FIGURE 3, which comprises a plate 230 fixed between trough walls 223 and floor 67, and slotted as at 232 to permit passage of the respective fingers or legs 26 therethrough, as indicated in FIGURE 2. The plate 230 extends the depth of the respective troughs or trays 60 and resilient flap members 234 are provided along either side of the respective slots 232 to form a seal against seed leakage and entrance of dust into the seed tray. The flap members 234 may comprise strips of a suitable natural or synthetic rubber or rubber-like material secured in place by rivets 236 or the like, and the flaps 234 extend the length of the respective slots 232.

In accordance with this invention, the individual fingers or legs 26 are provided at the juncture 102 of surfaces 52 and 54 (see FIGURE 4) with a short rod element 240 that extends to either side of the respective elements 26 a short distance. The rod 240 tends to provide an additional bracing action on the individual seeds 100 that are picked up by the fingers or legs 26, particularly during the period when the attached seed 100 is being pushed through the body of seeds in the respective trays or troughs 60. Of course, plate 230 should be opened as at 241 (see FIGURE 2) to accommodate elements 240.

In addition, an annular ridge or flange 250 extends between the fingers or arms 26 that are in coplanar relation transversely of the axis of rotation of the respective drums (see FIGURES 1 and 6). The ridge or flange 250 should be approximately ¼ of an inch thick and rise about ½ an inch above the surface of the drum rim 40. The ridges or flanges 250 define annular ring-like channels 251 about the drum rims for guiding extra corn kernels dropping back into the seed troughs in the area of the upper ends 253 of the seed troughs, and keep the seeds from bouncing against the fingers or legs 26.

The embodiments of FIGURES 9 and 10 include the structural details heretofore described to the extent that they are not inconsistent with the specific modifications therein illustrated. In the showing of FIGURE 9, roller 112 is journalled between arms 260 of U-shaped bracket 262 that is fixed within the respective drums 24 by nuts 264 acting against shaft 30. In the showing of FIGURE 10, hoppers 62a may be mounted on frame 12 in any appropriate manner.

*Distinguishing Characteristics of the Invention*

It will therefore be seen that I have provided a seed planter capable of heretofore unattainable accuracy while yet eliminating the highly disadvantageous and expensive practice of grading seeds according to size so that they may be used with conventional planter plates.

My planter arrangement is not only able to put more than one seed in place at a time, but also able to do so with a remarkably consistent accuracy.

The cradling or angled configuration of the drum vacuum fingers or legs is an important factor in providing the striking accuracy that is achievable by the practice of my invention in connection with corn seed. During operation of the apparatus, the seed becomes attached to the individual forwardly moving faces of the respective fingers, well above the drum surface, and the relation of parts is such that the attached seed as well as the respective fingers themselves do not retain other seeds in front of them to the extent that such other seeds move over the top of the drum. Furthermore, the supporting surface 52 formed at the ends of the fingers or legs defined by the foot 50 tend to guide the particular seed that is ultimately attached to the suction orifice towards such suction orifice. The preferred finger thickness specified above provides a stable support for only one seed, as the respective fingers are drawn through the seed troughs, so that seeds other than that attached to the respective fingers tend to fall away from the fingers as such fingers pass through and leave the troughs.

Those seeds which, in addition to the attached seeds, happen to be carried out of the body of seeds in the seed troughs are not stably held and therefore readily drop off the fingers and back into the seed troughs through the channels defined by the annular ridges or flanges of the drum.

However, it will be apparent that it is the general configuration of the individual fingers or legs 26 that is important, rather than the specific surfacing shapes shown in the drawings. For instance, surfaces 52 and 54 might be formed to merge in a smoothly rounded corner instead of the angled corner illustrated; or, surface 54 might be indented either outwardly or inwardly of the finger body. Likewise, the fingers 26 may be made completely hollow (which amounts to merely enlarging passages 44 and 46), or passage 44 may be defined by an exterior tube that is connected to the orifice 48 through the rear of the finger. Also the radial length of the fingers and their dimension rearwardly of surface 52 are not critical and can be as great or as small as engineering design may dictate.

Coupled with the sure and efficient pick-up action on the fingers is the release operation wherein all of the seeds for a particular hill are each released at exactly the same instant and they drop a short distance into the furrow of earth provided by the planter shoe (the usual distance being on the order of two to three inches). No guiding of the seed, no conventional tubular boot, and no control valves are necessary.

Since my apparatus eliminates the need for the conventional planter plate and its individual selection of the seeds for each hill, the speed of operation is not so critical. As a matter of fact, the only practical speed limitation on the operation of my invention is the maintaining of the planter shoe in cooperation with the soil to form the desired furrow, and tests have shown that for this reason operation speeds should be not much greater than five miles per hour.

The spacing between hills can be readily changed by increasing or decreasing the relative speed of rotation of the respective drums. Furthermore, additional fingers or legs 26 may be applied to the respective drums 24 and I contemplate that the drums 24 may be so formed to permit selective application and removal of such fingers or legs, including appropriate means for shutting off or opening up the drum rim openings as may be necessary or desirable.

My apparatus provides a constant rate of seed drop, except for discrepancies caused by wheel slippage, where the drive is provided by the planter wheels. The problem of wearing of calibrated or reciprocating parts is eliminated since the drums 24 are the only moving parts involved in the seed selection apparatus.

Furthermore, the accuracy and feed rate provided by the rotating drums 24 is not affected by the relative level of the seed in the seed hopper since the seed fingers will be fully operated so long as any seed remains in the feed conduit 64. And, the air flow through pressure chamber 78 in ejecting the seed from the vacuum orifices automatically clears such orifices of chaff and dirt.

The embodiment of FIGURE 10 permits efficient and consistent mixing of seeds for each hill, as well as the dropping of different seed types and the giving of each seed type its own spacing.

It should be apparent that any particular feeding action desired with regard to seed type, number and position may be obtained by suitably positioning an appropriate number of fingers or arms 26 with respect to a complementary number of seed troughs or trays 60 and rotating the drums 24 at the appropriate speed.

Planters conforming to the principles of this invention may be arranged for simultaneous two, four, or more row planting, as desired, and the use of this invention is not confined to planting of seeds. For instance, herbicides, fertilizers, and weed killers in pelletized or other granular form of appropriate size can readily be handled and/or dispensed in the manner already described, as may granular materials in general that are of appropriate shape and size.

While the disclosed invention was developed specifically for use in connection with the planting of corn seed, its utility extends equally as well to products such as soy beans, cotton, and the like having seed sizes comparable to corn seeds.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A corn seed planting device comprising:
  a member mounted for rotation in a predetermined direction about a substantially horizontal axis,
  and carrying a plurality of legs projecting outwardly of the axis of rotation thereof,
  said legs each being formed with a tapered foot projecting therefrom in the direction of rotation of said member,
  each of said legs being formed with a substantially planar surface of restricted size adjacent said foot thereof on their respective sides facing in the direction of movement, with said surfaces being disposed in planes that are at right angles to the plane and direction of rotation of said members,
  an orifice formed in each of said surfaces of said legs adjacent to but spaced from said foot,
  means for connecting said orifices to a source of vacuum,
  and means for momentarily disconnecting said orifices from the source of vacuum when said orifices respectively reach a predetermined position with respect to said axis of rotation.
2. In a corn seed planter of the type that includes a wheeled frame carrying a planter shoe and a press wheel in alignment longitudinally of the frame, a corn seed hill dropping device therefor comprising:
  a member carried by the frame and mounted for rotation in a predetermined direction about a substantially horizontal axis that extends substantially crosswise of the direction of movement of the planter,
  means for rotating said member,
  said member carrying a plurality of legs projecting outwardly of the axis of rotation thereof substantially equal distances,
  a seed trough carried by the frame,
  said legs being positioned and proportioned to move through said seed trough and thence to a seed planting position with respect to said shoe on rotation of said member,
  said legs each being formed with a foot projecting therefrom in said direction of rotation of said member and a substantially planar surface of restricted area adjacent said foot on the side thereof facing in the direction of movement of the respective legs and being substantially at right angles to the plane and direction of rotation of said member,
  said legs along the portions thereof that pass through said trough and on said sides thereof defining wedge shaped edges extending in the direction of said axis from the respective restricted surfaces thereof,
  said legs each having an orifice formed in said surface thereof facing in said direction of movement and adjacent to but spaced from said foot,
  said feet each including a seed guiding surface leading toward the orifice thereof,
  means for connecting said orifices to a source of vacuum,
  and means for momentarily disconnecting said legs from the source of vacuum when said orifices respectively reach a seed dropping position with respect to the planter shoe.
3. The device set forth in claim 2 wherein said foot and said leg sides have a width dimension that is in the range of from about 3/16 of an inch to about 1/4 of an inch.
4. The device set forth in claim 2 wherein:
  said member comprises a sealed drum including a cylindrical rim and
  wherein said legs are secured to said rim of said drum,
  said legs being in multiple row coplanar relation axially of said drum axis and substantially equally spaced from said axis of said drum thereby disposing said legs in rows that extend circumferentially of said drum rim, with the adjacent legs of the respective rows being connected by a ridge structure extending along the rim of said drum, whereby the ridge structure of adjacent leg rows form a dropping chute for seeds falling away from said legs.
5. The seeding device set forth in claim 2 wherein:
  said legs each include a rod like member secured thereto at the juncture of said foot surface and said leg,
  said rod like member extending transversely of the foot and projecting sidewise thereof to serve as a seed support.
6. The seeding device set forth in claim 2 wherein:
  said legs are arranged about said member in several coplanar rows lying in planes extending normally of said axis of rotation,
  wherein said seed trough has a shape complementing the rim of said drum,
  and wherein said seed trough is subdivided into separate receptacles corresponding to the paths of movement of the legs in the several coplanar rows.
7. In a corn seed planter of the type that includes a wheeled frame carrying a planter shoe and a press wheel in alignment longitudinally of the frame, a corn hill dropping device therefor comprising:
  a seed pick up member carried by the frame and mounted for rotation in a predetermined direction about a substantially horizontal axis that extends crosswise of the direction of movement of the planter,
  means for rotating said member,
  said member including a plurality of legs projecting outwardly of the axis of rotation thereof substantially equal distances,
  an arcuate seed trough positioned adjacent said member and proportioned to substantially complement the curvilinear configuration of the movement of said member legs,
  said trough being disposed along the lower quadrant of the leg rising side of said member, with respect to the direction of rotation of said member, said legs each being positioned and proportioned to move through said seed trough and thence to a downwardly moving seed planting position with respect to the planter shoe on rotation of said member, and on the leg lowering side of said member with respect to the direction of rotation thereof, said legs each being formed with a foot projecting therefrom in said direction of rotation of said member and an orifice in their sides facing in said direction of movement and adjacent said feet, said orifices of each leg being spaced from the juncture of the foot and leg in the direction of the axis of rotation of said member, and being formed in restricted surfaces facing in said direction of movement, said feet each including a seed guiding surface leading toward the orifice thereof, and said surfaces of said legs and feet being substantially planar and disposed at right angles to the plane of said direction of rotation of said member, and said surfaces of said legs and feet having a width dimension in the plane of said surfaces that is in the range of from about 3/16 of an inch to about 1/4 of an inch, said leg surfaces in which the respective orifices are formed being disposed substantially at right angles with respect to said direction of rotation, said legs along the portions thereof that pass through said trough, and on said sides thereof, defining wedge shaped edges extending in the direction of said axis from said restricted surfaces thereof, means for connecting said orifices to a source of vacuum, and means for momentarily disconnecting said orifices from the source of vacuum when said orifices respectively reach said seed planting position with respect to the planter shoe.

8. The device set forth in claim 7 wherein
said trough extends above the lower quadrant of the leg rising side of said member, and
wherein said trough includes orifice means for supplying seeds thereto that is positioned below the axis of rotation of said member.

9. The device set forth in claim 7 wherein
said orifices are spaced from the junction of the foot and leg of the respective legs a distance that is on the order of one-eighth of an inch.

10. The device set forth in claim 7 wherein
said orifice disconnecting means comprises means for supplying compressed air to said orifices.

11. The device set forth in claim 7 wherein
the leg entrance end of said trough is closed by resiliently deflectable flap means for containing seed within said trough and admitting said legs on rotation of said member.

References Cited in the file of this patent

UNITED STATES PATENTS

| | | |
|---|---|---|
| 183,896 | Brigham | Oct. 31, 1876 |
| 481,456 | Wright | Aug. 23, 1892 |
| 792,958 | Bagger | June 20, 1905 |
| 1,006,984 | Sheetz | Oct. 24, 1911 |
| 1,023,894 | Jass | Apr. 23, 1912 |
| 1,161,369 | Ayers | Nov. 23, 1915 |
| 1,637,834 | Oliver | Aug. 2, 1927 |
| 1,748,090 | Styka | Feb. 25, 1930 |
| 2,429,841 | Phillips | Oct. 28, 1947 |
| 2,737,314 | Anderson | Mar. 6, 1956 |
| 2,986,305 | Koerper | May 30, 1961 |

FOREIGN PATENTS

| | | |
|---|---|---|
| 512,178 | Great Britain | Aug. 30, 1939 |